United States Patent [19]

von Pragenau

[11] 4,452,412

[45] Jun. 5, 1984

[54] SPACE SHUTTLE WITH RAIL SYSTEM AND AFT THRUST STRUCTURE SECURING SOLID ROCKET BOOSTERS TO EXTERNAL TANK

[75] Inventor: George L. von Pragenau, Huntsville, Ala.

[73] Assignee: The United States of America as represented by the Administrator of the National Aeronautics and Space Administration, Washington, D.C.

[21] Appl. No.: 418,138

[22] Filed: Sep. 15, 1982

[51] Int. Cl.³ .......................... B64G 1/40; B64G 1/14
[52] U.S. Cl. ................................ 244/172; 244/158 R; 244/63
[58] Field of Search ...................... 244/63, 158 R, 160, 244/161, 162, 172; D22/11; D12/320; 102/347, 348, 374, 377, 378; 89/1.8

[56] References Cited

U.S. PATENT DOCUMENTS 2,960,034 11/1960 Besserer, Jr. ........................ 89/1.8
3,866,863 2/1975 von Pragenau ..................... 244/162
3,903,803 9/1975 Losey ................................ 102/378
3,929,306 12/1975 Faget et al. ......................... 244/162

OTHER PUBLICATIONS

"Space Shuttle 1978", *Status Report for the Committee on Science and Technology*, U.S. House of Representatives, Ninety-Fifth Congress, Jan. 1978.

*Primary Examiner*—Trygve M. Blix
*Assistant Examiner*—Rodney Corl
*Attorney, Agent, or Firm*—Leon D. Wofford, Jr.; John R. Manning; Joseph H. Beumer

[57] ABSTRACT

A space shuttle system (11) having an orbiter spacecraft (16) with main rocket engines (43) a large external propellant tank (12), and two solid rocket boosters (13,14). The propellant tank (12) has a forward pressure vessel (19) for liquid hydrogen and an aft pressure vessel (20) for liquid oxygen. The two solid rocket boosters (13, 14) are joined together by a thrust frame (15) which extends behind the external tank. The thrust of the orbiter's main rocket engines (43) are transmitted to the aft portion of the external tank (12).

2 Claims, 7 Drawing Figures

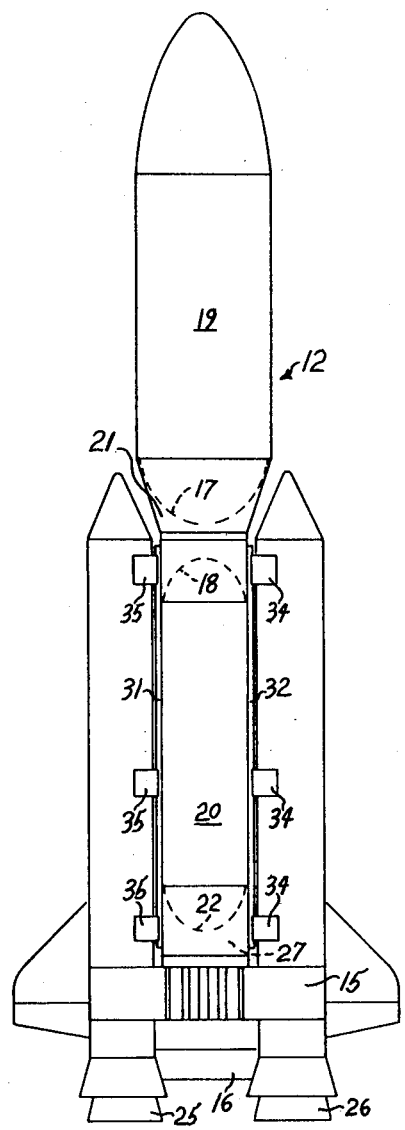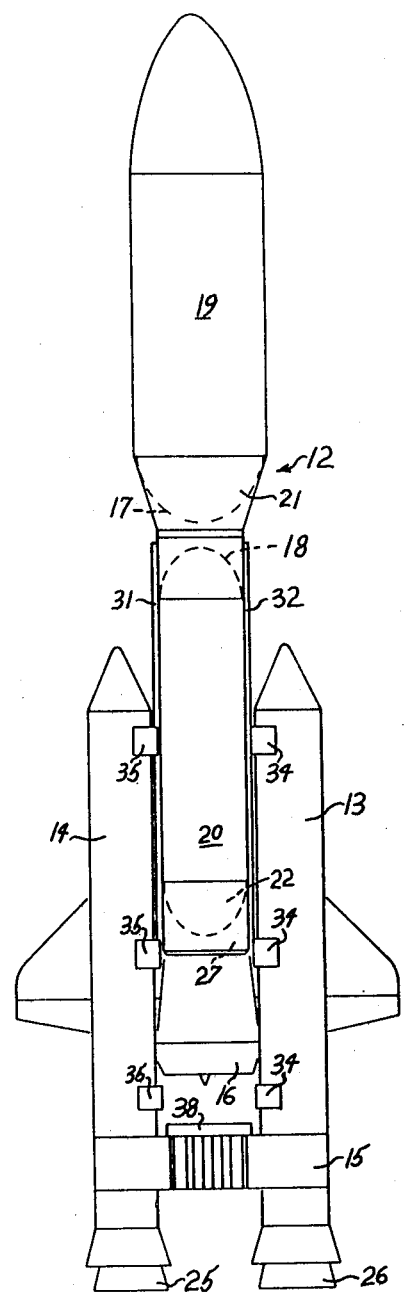
FIG. 5
FIG. 6

SPACE SHUTTLE WITH RAIL SYSTEM AND AFT THRUST STRUCTURE SECURING SOLID ROCKET BOOSTERS TO EXTERNAL TANK

ORIGIN OF THE INVENTION

The invention described herein was made by an employee of the United States Government and may be manufactured and used by or for the Government of the United States of America for Governmental purposes without the payment of any royalties thereon or therefor.

TECHNICAL FIELD

The invention relates to spacecraft adapted to be launched from earth, and particularly to the configuration and relationships of the external propellant tank and solid rocket boosters of space transportation systems, such as the space shuttle.

BACKGROUND ART

The space shuttle is now a proven space transportation system in which space crews will use the spacecraft orbiter again and again in launches from the earth. The space shuttle system is composed of the orbiter with its main rocket engines, which carries the crew and payload, a large external tank that contains the propellants for the orbiter's main engines, and two solid rocket boosters. The orbiter and boosters are reuseable, but the external tank is expended on each launch.

The space shuttle during ascent has the large cylindrical external tank at its center, the two cylindrical solid rocket boosters on opposite sides of the external tank, and the orbiter parallel to the third side of the external tank. The external tank is composed of a forward pressure vessel for cold liquid oxygen and a larger aft pressure vessel for cold liquid hydrogen and the two pressure vessels are joined together by a rather heavy cylindrical intertank or intervessel structure.

The two solid rocket boosters are attached to the external tank so the thrust therefrom is transmitted to the cylindrical intertank structure from two forward attaches. The aft attaches of the solid rocket boosters are hinged to the rear wall of the external tank so as to provide lateral rigidity only and do not transmit the thrust of the solid rocket motors.

The orbiter's forward attaches to the external tank are to the cylindrical intertank structure and are hinged for lateral rigidity only so as not to receive the thrust from the orbiter's main engines. It is the aft attach of the orbiter to the external tank that transmits the thrust of the orbiter's main engine, which results in the main engine thrust transversing the comparatively light pressure vessel for hydrogen before reaching the forward heavy pressure vessel for oxygen.

During ascent of the space shuttle, the solid rocket boosters following their depletion are explosively severed and eight small solid rocket motors move the boosters away from the external tank. A parachute is deployed from each booster so as to allow late recovery. Later during the launch the orbiter's attaches to the external tank are explosively severed to allow the external tank to be discarded. It is recognized that the external tank could be allowed to go into earth orbit with the space shuttle.

The indirect routing of the thrust loads from the orbiter and solid rocket boosters to the external tank requires the use of stiffening rings and frames which make the external tank unnecessarily heavy. The fact that the forward oxygen pressure vessel is the heaviest part of the external tank and cantilevered from the lighter aft hydrogen pressure vessel, requires that the solid rocket boosters thrust enter at only the forward attaches to the intertank structure. The intertank structure is heavy because it has to distribute the booster thrust from only two points. The large diameter of the external tank places the orbiter and solid rocket boosters far from the center line of the external tank and causes high aerodynamic drag losses during ascent.

BRIEF DESCRIPTION OF THE INVENTION

The present invention provides for an improved configuration of the external propellant tank and reverses the position of the two pressure vessels thereof so as to permit the application of the thrust of the solid rocket boosters and orbiter's main engines directly to the aft end of the external tank. The two solid rocket boosters are joined by as thrust frame which permits the boosters' thrust to apply circumferentially to the wall of the oxygen pressure vessel. The direct routing of thrust to the heaviest part of the external tank reduces its required structural requirements and correspondingly its weight which results in a significant payload gain for the orbiter.

The reversal of two pressure vessels can result in an improved configuration of the external tank in which the aft pressure vessel has a smaller diameter which places the orbiter and solid rocket boosters closer to the external tank centerline, and, permits the nesting of the solid rocket boosters partially behind the larger diameter forward pressure vessel for better aerodynamic characteristics. Also, the larger pressure vessel extending further from the orbiter than the oxygen vessel for the current space shuttle advances the aerodynamic effects center next to the mass center of the space shuttle and reduces impingements of the shock wave on the orbiter.

Accordingly, it is an object of the present invention to provide a space shuttle which achieves significant payload gains by changing the pressure vessels of the external tank and its thrust transfer points.

Another object is to provide an external tank that has a configuration which permits significant reductions in aerodynamics drag.

Another object is to join the solid rocket booster with a frame structure which allows the thrust to be applied directly to the aft end of the external tank.

Another object is to provide an external tank for the space shuttle with usable space for hauling cargo and other purposes.

Yet another object is to reduce ignition jolts of the solid rocket booster by transfering its thrust through an aft located thrust frame.

Other objects will become apparent as the description of the invention proceeds.

BRIEF DESCRIPTION OF THE DRAWINGS

FIG. 5 is a bottom view of the space shuttle of FIG. 1.

FIG. 6 is a bottom view of the space shuttle when the solid rocket boosters are being separated.

DETAILED DESCRIPTION OF THE INVENTION

Figure 1:
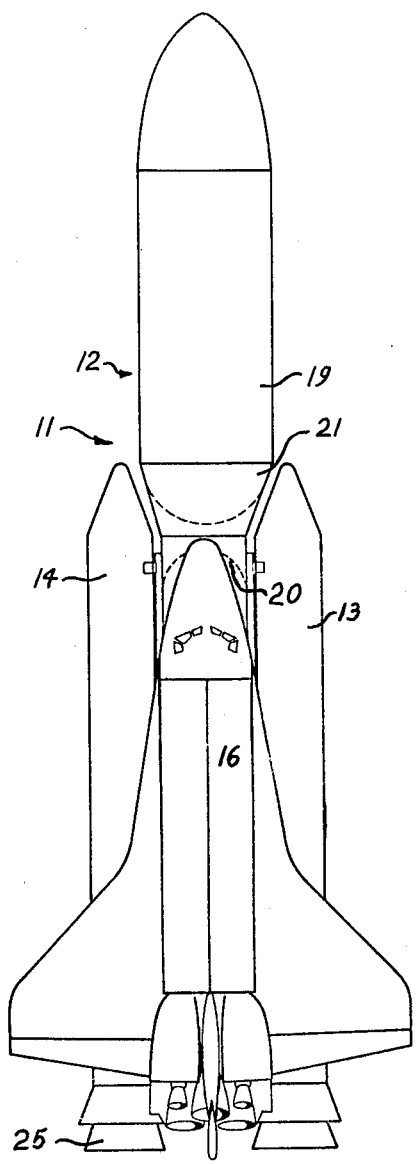
FIG. 1 is a top view of a space shuttle according to the present invention.
Figure 2:
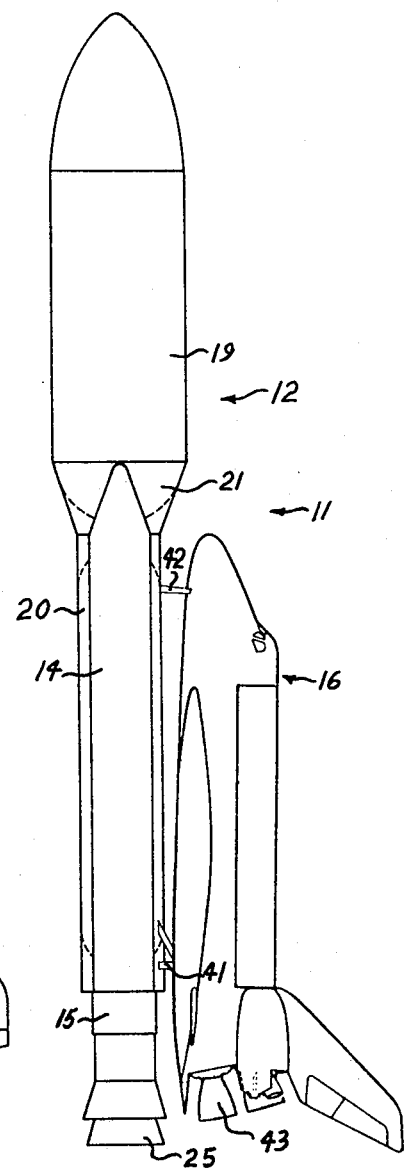
FIG. 2 is a side view of the space shuttle of FIG. 1.

Referring to the drawings, there is shown in FIGS. 1 and 2, a space shuttle 11 according to the present invention having an improved external tank 12, two solid rocket boosters 13 and 14 on opposite sides of the external tank, but joined together with a thrust frame 15, and the orbiter 16 on the third side of the external tank.

The external tank 12 has a forward cylindrical pressure vessel 19 for liquid hydrogen, an aft cylindrical pressure vessel 20 for liquid oxygen, and an intervessel structure 21 fastening the two pressure vessels together. The forward pressure vessel is placed forward and parallel to the orbiter. The vessel's dimensions which are similar to that of the aft vessel of current space shuttle, are such as to result in the placing of the aerodynamic center of the space shuttle next to the mass center, which negates wind shear effects, allows lofting trajectories, and reduces the shockwave impingement on the orbiter. By providing the aft pressure vessel 20 with a length to match the current attaches of the orbiter, its required volume for the liquid oxygen will be such that the diameter of the vessel will be reduced by about ten feet from the diameter of the forward pressure vessel.

Figure 3:
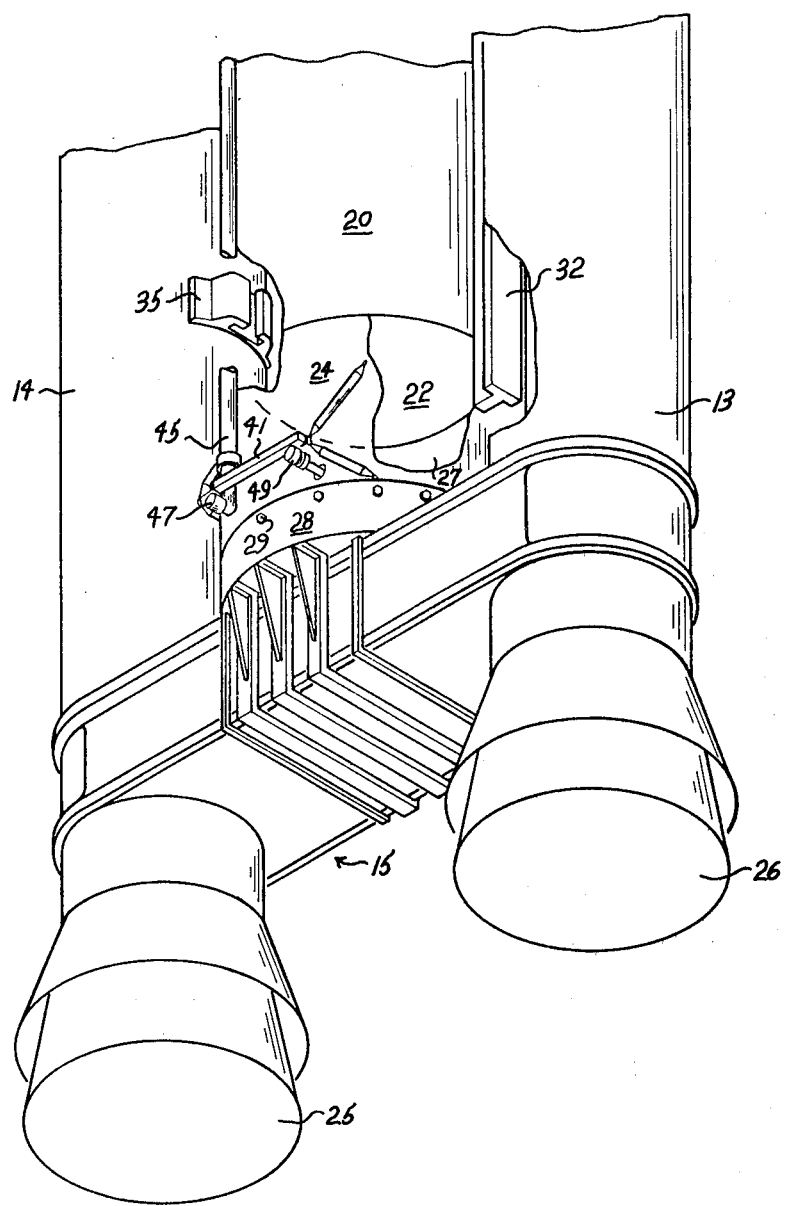
FIG. 3 is a partial view of the aft end of the external tank and solid rocket booster.
Figure 4:
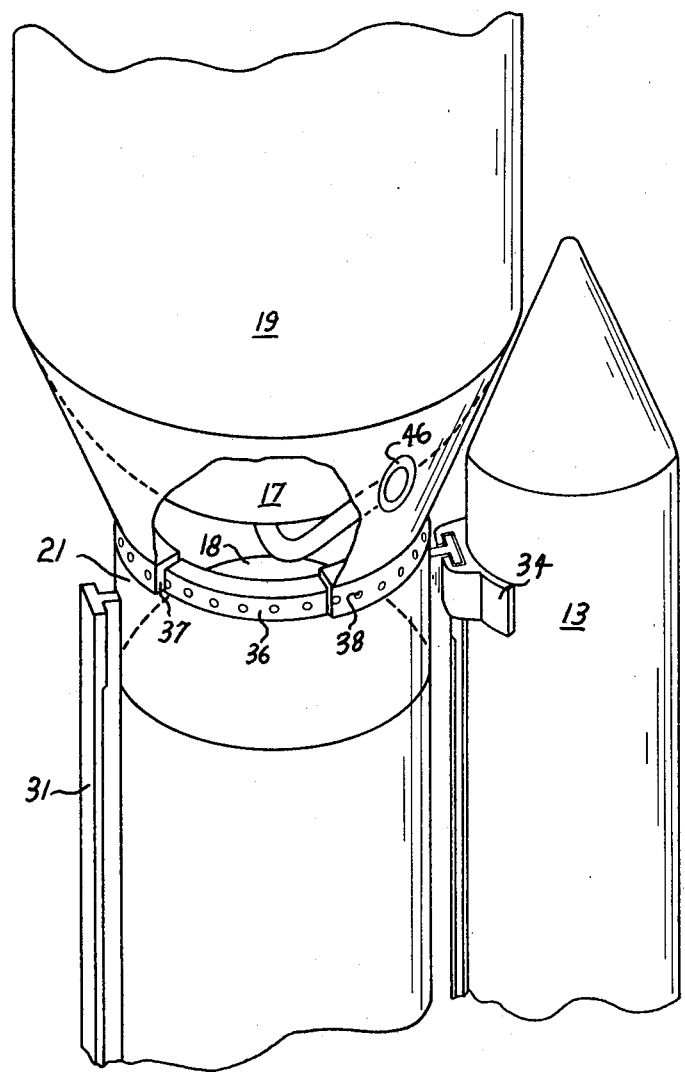
FIG. 4 is a partial view of the intervessel structure of the external tank.

As indicated in FIGS. 3 and 4, the forward pressure vessel 19 has an aft dome 17 and the aft pressure vessel 20 has a forward dome 18 and an aft dome 22.

In this configuration, the orbiter 16 and solid rocket boosters 13 and 14 which are behind the forward pressure vessel 19 are closer to the centerline of the external tank 12, and this allows for an improved aerodynamic characteristic during ascent. Also, as can be seen, the solid rocket boosters 13 and 14 can be partially nested behind the larger diameter pressure vessel 19.

The solid rocket boosters 14 and 15 are joined together adjacent their nozzles 25 and 26 by the structural frame 15 which extends across and behind the external tank 12 so as to transmit the thrust of the booster motors to the aft end of the external tank 12. This is accomplished as shown best in FIG. 3 by having a cylindrical wall extension 24 to the aft end of the aft pressure vessel 20, which defines usable space 27 and which can be utilized for cargo or other purposes, and a cylindrical cover 28 which is part of the structural thrust frame 15 of the solid rocket boosters and which is secured to the cylindrical wall extension 24 by bolts 29 adapted to be explosively severed on command.

The solid rocket boosters 13 and 14 are secured to the external tank for axial movement by a pair of T-shaped guide rails 31 and 32 fastened to the external tank 12, and sliders 34 and 35, forward, middle, and aft, attached to the boosters and which engage the flanges of the guide rails 31 and 32. The guide rails 31 and 32 are shown in FIG. 4 are of a heavier construction at their ends which is where the forward sliders 34 and 35 are positioned when the boosters 13 and 14 are in launch position. The forward sliders 34 of the boosters have a convex curved contact surface with the guide rail flange to allow a degree of pivoting movement when the solid rocket boosters are slid back off the rails when being separated as shown in FIG. 5.

As shown best in FIG. 4, the intervessel or intertank structure 21 for joining the two pressure vessels 19 and 20 can be split for manufacturing, transporting, and assembly purposes by having a stiff ring structure made up of a male flange 36 and a female flange 37 which can be joined together with bolts 38.

The orbiter's aft attach cradle 41 mounts directly onto the aft pressure vessel 20 and transmits the full thrust of the orbiter's main engines 43 directly to the vessel's cylindrical structural wall. The orbiter's forward attach cradle 42 is hinged to the intertank structure 21 so as to provide lateral rigidity but does not transmit the thrust of the main engines 43.

As indicated by FIG. 3, hydrogen from the forward pressure vessel is supplied by an external pipe line 45 along the wall of the external tank which pipe line 45 communicates with the forward pressure vessel when joined to the exit pipe flange 46 shown in FIG. 4. The external pipe line ends with a flange 47, within the area of the aft orbiter attaches 41, for joining with the orbiter hydrogen feed line for the main engines 43. Similarly, the exit pipe line for the aft pressure tank 20 has a joint flange 49 adjacent the aft orbiter attaches 41 for joining with the orbiter oxygen feed line for the main engines 43.

The space shuttle 11 as described offers significant advantages in providing for improved performance and capability. The split ring 36, 37 of the intertank structure 21 permits the external tank 12 to be more easily fabricated, handled, and transported to the launch site. The aft thrust frame 15 of the solid rocket boosters 13 and 14 permits the thrust to be applied on the cylindrical wall structure 24 of the external tank, and at the same time serve as a shield protecting the external tank against the booster motor exhaust. The T-shaped rails 31, 32 and sliders 34, 35 arrangement of the solid rocket boosters 13, 14 and external tank 12 permits axial moveability between the two without transmitting thrust.

Separation of the solid rocket boosters 13 and 14 and external tank 12 during flight is initiated by explosively severing the bolts holding the thrust frame 15 to the aft cargo hold 24 before the solid rocket booster thrust is terminated. The solid rocket booster will then start to slide backward as shown in FIG. 6 when the booster thrust decreases. While no small solid rocket motors need to be provided for the solid rocket boosters 13 and 14, they could be utilized for quicker separation from the external tank 12.

The space shuttle 11 described provides for an optimum configuration in which tank insulation will be less and aerodynamic drag is less. The large diameter forward pressure vessel 19 of the external tank 12 shields the downstream cluster from shock wave impingements and certain air flow heating.

Figure 7:
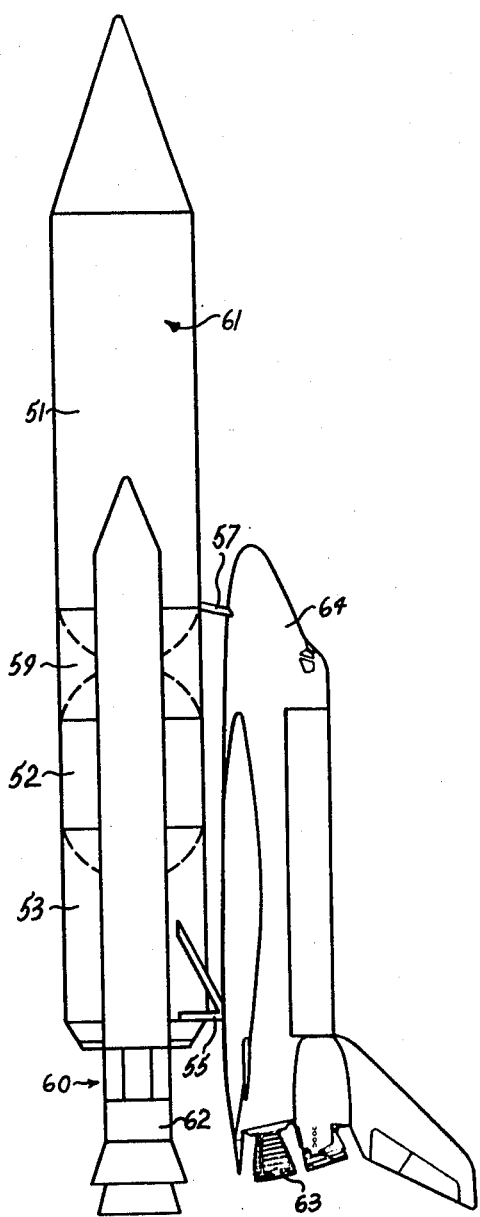
FIG. 7 is a side view of a space shuttle with modifications to the external tank.

A modification of the invention is illustrated in FIG. 7, in which the two pressure vessels 51 and 52 are of equal diameter. While the configuration does not offer the aerodynamic advantages of the space shuttle 11 of FIG. 1, the aft cargo hold 53 becomes large and significant because of the shorter aft pressure vessel 52 for the oxygen. The domes of the two pressure vessels are indicated by broken lines. In this modification, the orbiter aft attach cradle 55 mounts directly onto the aft cargo wall structure 53 and transmits the main engine thrust directly onto the external tank wall structure. The orbiter forward attaches 57 are hinged directly to the stiff ring portion joining the intertank structure 59 to the aft portion of the forward pressure vessel. The forward pressure vessel for hydrogen extends forward and parallel of the orbiter, similarly to that described in FIG. 1. The thrust frame 60 of the solid rocket boosters 62 is utilized to apply the thrust directly to the rear wall structure 53 of the external tank. It is the direct routing of the thrust of the main rocket engine 63 and solid rocket boosters 62 so as to apply the thrust to the heavy liquid oxygen aft pressure vessel 52 that permits a structural design of the extenal tank 61 which is less in weight than that of the current space shuttle.

The relative axial mobility of the forward portions of the orbiter and solid rocket boosters to the external tank permits length changes in these components which is not available with the current space shuttle.

While the invention has been described relative to specific embodiments, it is evident that modifications and changes may be made with regard thereto with departing from the scope of the claims.

I claim:

1. In a space shuttle having an orbiter spacecraft with main rocket engines, an external tank for propellants parallel to said orbiter spacecraft, and a pair of solid rocket boosters on opposed sides of said external tank, the improvement comprising;

said external tank having a forward cylindrical pressure vessel for holding liquid hydrogen, an aft cylindrical pressure vessel with end domes for holding liquid oxygen, and a cylindrical intertank structure joining the two pressure vessels together;

said forward pressure vessel being parallel and extending ahead of the orbiter spacecraft and said aft pressure vessel being parallel and within the length of said orbiter spacecraft;

said solid rocket boosters joined together with a structural frame adjacent their rocket nozzle ends, said frame extending behind said external tank and adapted to apply the thrust generated by said rocket boosters to the aft cylindrical end of said external tank;

said aft pressure vessel having a cylindrical wall extension which defines a usable space about the aft end dome of said aft pressure vessel;

cylindrical cover means on said structural frame severably secured to the rear of said cylindrical wall extension;

means rigidly securing the orbiter spacecraft to the cylindrical wall of said aft pressure vessel so as to apply the thrust of the rocket engines of said orbiter spacecraft to the structural wall of said aft pressure vessel;

said external tank having a pair of guide rail means positioned axially on its outer surface and adjacent each said solid rocket booster' and each said solid rocket booster having slider means engaging its adjacent rail means whereby said rocket boosters when depleted may slide backward and disengage from said external tank by severing said cylindrical cover means of the structural frame from said cylindrical wall extension.

2. In a space shuttle according to claim 1, wherein each said guide rail means is T-shaped and having its crossed flange engaged by said slider means of said rocket boosters.

* * * * *